United States Patent
Liaqat et al.

(10) Patent No.: US 12,455,354 B2
(45) Date of Patent: Oct. 28, 2025

(54) AUTONOMOUS MOBILE AIRCRAFT INSPECTION SYSTEM

(71) Applicant: AIRBUS OPERATIONS LIMITED, Bristol (GB)

(72) Inventors: Amer Liaqat, Bristol (GB); Lloyd Tinkler, Bristol (GB); Philip Yates, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 1078 days.

(21) Appl. No.: 17/593,344

(22) PCT Filed: Jun. 23, 2020

(86) PCT No.: PCT/EP2020/067483
§ 371 (c)(1),
(2) Date: Sep. 16, 2021

(87) PCT Pub. No.: WO2020/260272
PCT Pub. Date: Dec. 30, 2020

(65) Prior Publication Data
US 2022/0187428 A1 Jun. 16, 2022

(30) Foreign Application Priority Data
Jun. 28, 2019 (GB) ...................................... 1909386

(51) Int. Cl.
*G01S 17/89* (2020.01)
*B64F 5/60* (2017.01)
(Continued)

(52) U.S. Cl.
CPC .............. *G01S 7/4817* (2013.01); *B64F 5/60* (2017.01); *G01S 7/4802* (2013.01); *G01S 17/89* (2013.01);
(Continued)

(58) Field of Classification Search
CPC .......... G01S 17/89; G01S 7/4817; B64F 5/00; G01D 1/00; B25J 19/02
See application file for complete search history.

(56) References Cited

U.S. PATENT DOCUMENTS 8,290,305 B2 * 10/2012 Minear ...................... G06T 7/32
348/580
9,234,904 B2 * 1/2016 Troy ....................... G01N 21/00
(Continued)

FOREIGN PATENT DOCUMENTS

CN 104848851 8/2015
CN 105354875 A 2/2016
(Continued)

OTHER PUBLICATIONS

International Search Report for PCT/EP2020/067483 mailed Aug. 17, 2020, 4 pages.
(Continued)

*Primary Examiner* — Tan Q Nguyen
(74) *Attorney, Agent, or Firm* — Nixon & Vanderhye P.C.

(57) ABSTRACT

An autonomous inspection system including at least one autonomous mobile robot. The robot has two-dimensional LiDAR scanners each having a two-dimensional scanning plane. The scanners are mounted on the autonomous mobile robot with scanning plane orientations which are non-coplanar. A processor includes an input to receive point data from the plurality of LiDAR arrays and an output to provide inspection data. The processor is configured to compile the point data from the plurality of LiDAR scanners into three-dimensional plot of the surrounding of the autonomous mobile robot and identify the dimensions and profile of articles within the three-dimensional plot.

17 Claims, 4 Drawing Sheets

(51) Int. Cl.
  *G01S 7/48*    (2006.01)
  *G01S 7/481*   (2006.01)
  *G05D 1/00*    (2006.01)
  *G06T 7/00*    (2017.01)
  *B64F 5/00*    (2017.01)

(52) U.S. Cl.
  CPC .......... *G05D 1/0274* (2013.01); *G06T 7/001* (2013.01); *G06T 2207/10028* (2013.01); *G06T 2207/30252* (2013.01)

(56) References Cited

U.S. PATENT DOCUMENTS

| | | | |
|---|---|---|---|
| 2013/0231779 A1 | 9/2013 | Purkayastha et al. | |
| 2015/0012171 A1 | 1/2015 | Richter et al. | |
| 2015/0352721 A1* | 12/2015 | Wicks | G06V 20/10 700/228 |
| 2015/0379766 A1* | 12/2015 | Newman | H04N 13/296 356/5.01 |
| 2016/0075020 A1 | 3/2016 | Szarski et al. | |
| 2016/0264262 A1 | 9/2016 | Colin et al. | |
| 2018/0031705 A1* | 2/2018 | Haines | G01S 17/42 |
| 2018/0101932 A1* | 4/2018 | Kwon | G06T 3/14 |
| 2018/0240226 A1 | 8/2018 | Szarski et al. | |
| 2018/0307232 A1* | 10/2018 | Myeong | G01S 17/89 |
| 2019/0256226 A1* | 8/2019 | Shapoury | G06T 7/73 |

FOREIGN PATENT DOCUMENTS

| | | |
|---|---|---|
| CN | 106324619 | 1/2017 |
| EP | 3 486 870 | 5/2019 |
| WO | 2014/128498 | 8/2014 |
| WO | 2017/025521 | 2/2017 |
| WO | 2017/153912 | 9/2017 |

OTHER PUBLICATIONS

Written Opinion of the ISA for PCT/EP2020/067483 mailed Aug. 17, 2020, 7 pages.
Combined Search and Examination Report for GB1909386.3 mailed Dec. 10, 2019, 8 pages.
Search Report for GB1909386.3 mailed Mar. 3, 2020, 9 pages.
Futterlieb et al., "Air-Cobot: Aircraft Enhanced Inspection by Smart and Collaborative Robot", LAAS-CNRS, Feb. 2017, 7 pages.
JovanceVi, "Exterior inspection of an aircraft using a Pan-Tilt-Zoom camera and a 3D scanner moved by a mobile robot: 2D image processing and 3D point cloud analysis", HAL, Jan. 18, 2018, 227 pages.
Wilhelmsen et al, "Remote Aircraft Composite Inspection Using 3D Imaging", IEEE, Jul. 6, 2016, pp. 316-322.

* cited by examiner

AUTONOMOUS MOBILE AIRCRAFT INSPECTION SYSTEM

TECHNICAL FIELD

The present invention relates to autonomous inspection systems and methods of autonomous inspection. Particularly, but not exclusively, embodiments relate to aircraft structure inspection.

BACKGROUND

Automation has an increasingly important role in manufacturing, for example, to increase manufacturing efficiency or improve safety. Automated systems are commonplace in many industries, for example automotive manufacturing. Automated systems may however be expensive and difficult to implement in some industries. For example, aerospace manufacturing (and particularly commercial aircraft manufacturing) where facilities typically occupy large footprint due to size and scale of the product as well as complexity and number of various different manufacturing and assembly processes. For such industries, autonomous systems provide much greater benefit compared to automated systems. An autonomous system can be contrasted to an automated system since it is able to carry out tasks with a greater degree of independence, for example an autonomous system may be adaptive, able to learn and have an ability to make "decisions". As such an autonomous system may for example be able to work in a location where the system has not previously been used or in a dynamic environment where other systems or items are not in a known location. In contrast an automated system (for example manufacturing robots in automotive manufacturing) will generally be dedicated to performing a repetitive task in a highly controlled environment.

One area where the use of autonomous vehicles or robots may be beneficial is in the inspection of aerostructures. For example, such inspection may be routinely required during aircraft manufacture (for example in final assembly lines) and also at aircraft Maintenance, Repair and Overhaul facilities (which will be referred to herein by the standard acronym "MRO"). Known solutions for automated solution generally require the use of expensive three-dimensional scanners or cameras, for example 3D light direction and ranging (LiDAR) scanners. Such scanners may for example be used in simultaneous localisation and mapping (SLAM) arrangements. To reduce complexity and/or cost some systems, such as handheld system, have been known to replace 3D scanners with moving 2D scanners (for example scanners on a flexible mount which can be swept across a scanned item). However, such systems may not provide good response times and cause longer inspection times. Further, health and safety issues may arise in the use of such systems in industrial environments.

One example of potential automation in aircraft MRO applications is the "Air-Cobot" project which is developing a wheeled collaborative mobile robot for assisting human in inspection activities (and as described for example in the paper "Air-Cobot: Aircraft Enhanced Inspection by Smart and Collaborative Robot" available at: http://laris.univ-angers.fr/_resources/IFAC2017/IFAC_Paper_3176.pdf). The Air-Cobot robot is able to perform autonomously navigation and routinely inspection tasks. The Air-Cobot robot is provided with an array of sensing systems including navigation sensors including four cameras, two laser range finders, a Global Positioning System (GPS) receiver; and an Initial Measurement Unit (IMU); and also non-destructive testing sensors including: a Pan-Tilt-Zoom (PTZ) camera and a 3D scanner.

At least some embodiments of the invention, seek to provide an alternative inspection robot, for example it may be desirable to provide a more cost-effective robot system or a robot system having reduced complexity to enable use of autonomous inspection in a wider range of applications, or a system with better range, accuracy and speed.

SUMMARY

One aspect of the present invention provides an autonomous inspection system comprising: at least one autonomous mobile robot, the robot having a plurality of two-dimensional LiDAR scanners each scanner having a two-dimensional scanning plane, the plurality of scanners being mounted on the autonomous mobile robot with scanning plane orientations which are non-coplanar; and a processor comprising: an input to receive point data from the plurality of LiDAR arrays; an output to provide inspection data; the processor being configured to compile the point data from the plurality of LiDAR scanners into three-dimensional plot of the surrounding of the autonomous mobile robot and identify the dimensions and profile of articles within the three-dimensional plot. In particular embodiments provide an autonomous mobile aircraft inspection system.

A further aspect of the invention provides a method of scanning an airframe, the method comprising: providing an autonomous mobile robot having a plurality of two-dimensional LiDAR scanners, the plurality of arrays being mounted with scanning planes in non-coplanar orientations on the autonomous mobile robot; navigating the autonomous mobile robot around the space surrounding the airframe whilst scanning the space surrounding the autonomous mobile robot with the LiDAR scanners; compiling an image of the airframe from the point data of the LiDAR scanners.

A further aspect of the invention provides a machine readable storage medium comprising instructions executable by a processor to: receive two-dimensional point data from a plurality of LiDAR scans, stitch the two-dimensional point data to form a three-dimensional plot; combine the LiDAR scan data with stored mapping data; and identify features of objects within the three-dimensional plot and compare the dimensions and/or profile of the identified features to flag defects or non-conformities in the scanned objects.

A further aspect of the invention provides an autonomous mobile robot comprising: a plurality of two-dimensional LiDAR scanners, each scanner having a fixed two-dimensional scanning plane extending outwardly from the robot wherein the plurality of two dimensional LiDAR scanners are positioned such that a three dimensional scanning envelope is defined around the autonomous mobile robot extending outwardly in both a horizontal and vertical direction beyond the periphery of the autonomous mobile robot; and a process configured to receive two-dimensional point data from the plurality of LiDAR scans and stitch the two-dimensional point data to form a three-dimensional plot of the space surrounding the autonomous mobile robot.

The plurality of scanners mounted on the autonomous mobile robot with scanning plane orientations which are non-coplanar also have scanning plane orientations which are non-parallel.

Embodiments of the invention advantageously enable a three-dimensional scanning inspection activity to be carried out without the need for a dedicated 3D scanner to be provided. This provides advantages in reducing the cost of the scanning system since two-dimensional LiDAR scanners are readily commercially available and significant lower cost that commercially available three-dimensional scanning systems. It will be appreciated that reduction in cost and complexity of the scanning arrangements in embodiments of the invention may, therefore, enable autonomous scanning to be more widely implemented.

In particular, the invention goes against the conventional approach in the art of using dedicated 3D scanners as the inventors have surprisingly found that current two-dimensional LiDAR scanners provide sufficiently accurate scanning detail (for example down to an accuracy of 20-30 µm) to enable a reliable three-dimensional plot to be built up. Embodiments may provide resulting three-dimensional data which is both sufficiently accurate for general inspection and may even provide data quality which is at least as good as conventional inspection or measurement techniques such as dedicated large volume metrology equipment.

Scanning using fixed two-dimensional LiDAR scanners on an autonomous mobile robot platform may also enable significant time savings in comparison to existing or manual or automated measurements system. For example, it may be noted that two-dimensional LiDAR scanners may provide accurate position data at ranges up to the region of 20-25 m from the scanner. Thus, it will be appreciated that embodiments may scan large items quickly whilst also providing high quality data. This is particularly useful in Aircraft manufacturing or MRO facilities due to the scale of aircraft and airframe structures. As such, embodiments of the invention may particularly be configured for use in aerospace inspection. For example, for MRO facilities and the like, embodiments of the invention may be used for surface defect identification and inspection. In aircraft manufacturing applications, embodiments may for example be used to confirm shape conformance of aircraft structures.

The plurality of two-dimensional LiDAR scanners may each detect point data representing a cross section of the respective plane in which the scanner is aligned.

The plurality of two-dimensional LiDAR scanners have a fixed orientation relative to the autonomous mobile robot. Whilst the fixed orientation may be adjustable (for example during initial configuration), for simplicity embodiments do not require any movement of the LiDAR scanners relative to the autonomous mobile robot during use. This may help reduce scanning time. For example fixed scanners may reduce scanning time in comparison to systems using a two-dimensional scanner which is moved (for example panned, tilted or rotated) to build up three-dimensional information.

In embodiments of the invention the plurality of two-dimensional LiDAR scanners includes at least one scanner having a scanning plane extending vertically above the robot. This ensures that the system scans an envelope which extends not only horizontally around the autonomous mobile robot but also above the robot and helps to build up a full three-dimensional plot. This may be in contrast to approaches in which two-dimensional LiDAR scanners are only used for navigation and/or collision avoidance (such that where vertically extending the scan above the robot would likely be seen as unnecessary).

In particular, embodiments of the invention include at least one scanner having a scanning plane which is close to the vertical axis (or more particularly the axis which is perpendicular to reference plane extending through the autonomous mobile robot). For example, at least on scanning plane may be aligned at less than 45 degrees to the vertical (in other words the scanning plane may have a greater vertical component than horizontal component).

A pair of two-dimensional LiDAR scanners may be arranged with vertically extending non-coplanar scanning planes. For example, each scanning plane may be inclined on opposing sides of an axis perpendicular to the plane of the robot. The pair of two-dimensional LiDAR scanners may have planes which are at an acute angle to one another about an axis perpendicular to the plane of the robot. The pair of two-dimensional LiDAR scanners with vertically extending non-coplanar scanning planes may also each be rotated relative to the longitudinal axis of the robot. The rotation of the scanning planes may increase the scan coverage of the envelope surrounding the robot.

The plurality of two-dimensional LiDAR scanners may also comprise at least one scanner arranged with a scan plane extending generally horizontally (or more particularly the axis which is parallel to a reference plane extending through the autonomous mobile robot). A plurality of generally horizontal scanners may be provided in some embodiments. For example, each scanner may have a scanning arc (the scanning area of each scanner typically being a sector lying in the scanning plane and extending about the scanner about an arc length defined by the configuration of the scanner). plurality of generally horizontal scanners may be aligned to provide 360-degree scan coverage around the robot.

The processor may be further configured to combine the point data with stored map data. The known position of the autonomous mobile robot with respect to the stored map data may be associated with the point data for combining the map data and point data. For example, known position data may be provided from a navigation system of the autonomous mobile robot. Time stamp data may also be recorded in the point data and resulting three-dimensional plot. For example, time data could be used to enable real-time deformations and/or movements of items to be measured (which may be particularly useful in manufacturing situations).

The processor may be configured by including a machine readable medium comprising instructions executable by the processor to execute the steps of compiling the point data from the plurality of LiDAR scanners into three-dimensional plot of the surrounding of the autonomous mobile robot and identifying the dimensions and profile of articles within the three-dimensional plot (for example by comparing the plot to stored item data).

The processor may be the processor of the autonomous mobile robot. Alternatively, or additionally, the processor may be a centralised processor in communication with the autonomous mobile robot. A centralised processor could, for example, be part of a cloud computing system. A central processor could, for example, accumulate data from multiple autonomous mobile robots. For example, in some embodiments the inspection system could include a plurality of autonomously mobile robots in accordance with embodiments and the processor could compile the point data from a plurality of LiDAR scanners on each mobile robot into a combined three-dimensional plot.

Whilst aspects of the invention have been described above, the invention extends to any inventive combination of features set out above or in the following description

BRIEF DESCRIPTION OF THE DRAWINGS

Embodiments of the invention will now be described, by way of example only, with reference to the accompanying drawings, in which.

DETAILED DESCRIPTION

The terms "horizontal" and "vertical" are used herein for clarity and may be appreciated to be references to the general directions relative to the autonomous mobile robot in use and are not intended to be narrowly construed. In particular, it will be appreciated that the horizontal direction is generally parallel to an x-y reference plane extending through the autonomous mobile robot and is substantially parallel to the substrate on which the robot is operating (which may not be a true horizontal if sloped). The vertical direction will likewise generally be parallel to a z axis which extends perpendicularly to the x-y reference plane. For the purpose of accurate data capture a scanning system may have navigation systems for identifying the orientation of the autonomous mobile robot such that data captured relative to the axis of the autonomous mobile robot in use can be corrected to a universal axis.

Figure 1:
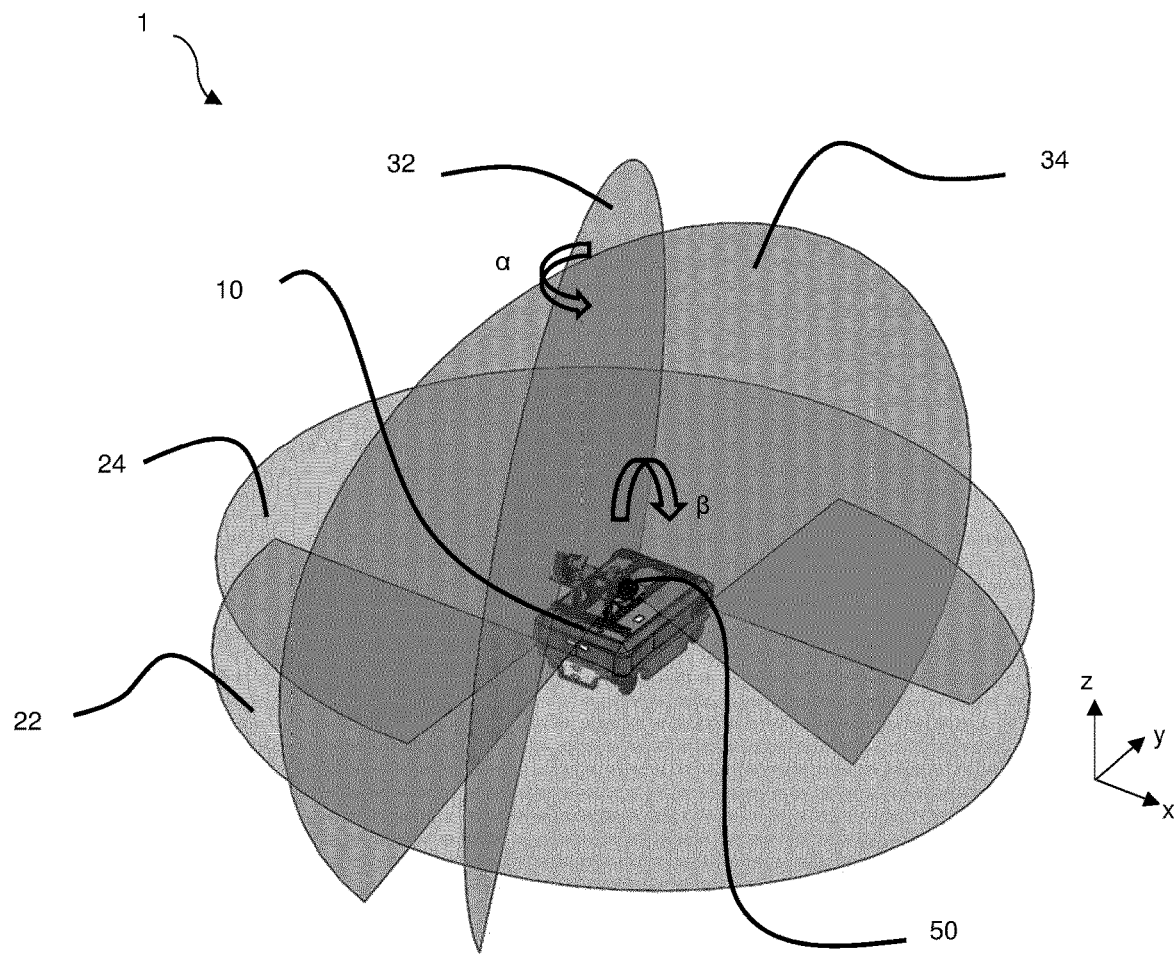
FIG. 1 shows a schematic view of an autonomous mobile robot for use in embodiments of the invention.

An autonomous mobile aircraft inspection system 1 in accordance with an embodiment of the invention is shown in FIG. 1. The system comprises at least one autonomous mobile robot 10. The autonomous mobile robot includes a multiple, in the illustrated example four, two-dimensional LiDAR (light directional and ranging) scanners 50. Each scanner may be a commercially available safety-rated LiDAR devices each scanner having a two-dimensional scanning plane 22, 24, 32, 34. The scanners 50 jointly define a scan envelope extending in three-dimensions around the robot 10. In particular, it may be noted that the scanners are arranged so that the envelope fully surrounds the robot 10 in the horizontal axis and also extends fully around the robot 10 in the vertical axis (at least from the floor to upwards). In the example shown the robot 10 is provided with a first pair of scanners which have scanning planes 22 and 24 in generally horizontal planes and a second pair of scanners which have scanning planes 32, 34 in generally vertical planes. Using commercially available two-dimensional safety rated LiDAR scanners it has been found that the scanning planes 22, 24, 32, 34 may have a range of up to around 20 to 25 m and provide a scan accuracy of around 20-30 μm.

The two generally horizontal scanning planes 22, 24 are spaced apart in the vertical direction. The scanning planes 22 and 24 may be parallel planes and may be parallel to the x-y reference plane of the robot 10. Typically, each scanner has a scan arc which covers a sector in the scanning plane which is less than 360 degrees. As such to minimise or remove any blind spots from the scanning the two scanning planes 22 and 24 are rotated relative to one another about the vertical (z) axis. For example, the non-scanned minor sectors of each scanning plane 32, 34 may be diametrically opposed.

The two generally vertical scanning planes 32 and 34 are set at an angle to one another to maximise the scan area of the envelope. The scanning planes 32 and 34 may be each inclined relative to the vertical axis and to one another, for example an acute angle β may be provided between the two scanning planes 32 and 34 about the y axis such that each scanning plane has a few degrees of inclined (for example less than 10 degrees) relative to the vertical direction. The scanning planes 32 and 34 may also be rotated in opposite relative to the z axis such that they are angled relative to the longitudinal axis of the robot 10.

The autonomously guided robot 10 will include a processor to control its navigation movement and scanning. Typically, the robot 10 will also be communicably coupled to a network (for example via a wireless network) and a centralised controller may be provided in the network. Thus, it may be appreciated that depending upon the particular system configuration it may be preferable for data from the scanners 50 is processed by the processor of the robot 10 or whether data is transmitted in a basic format and processed separately.

Figure 2:
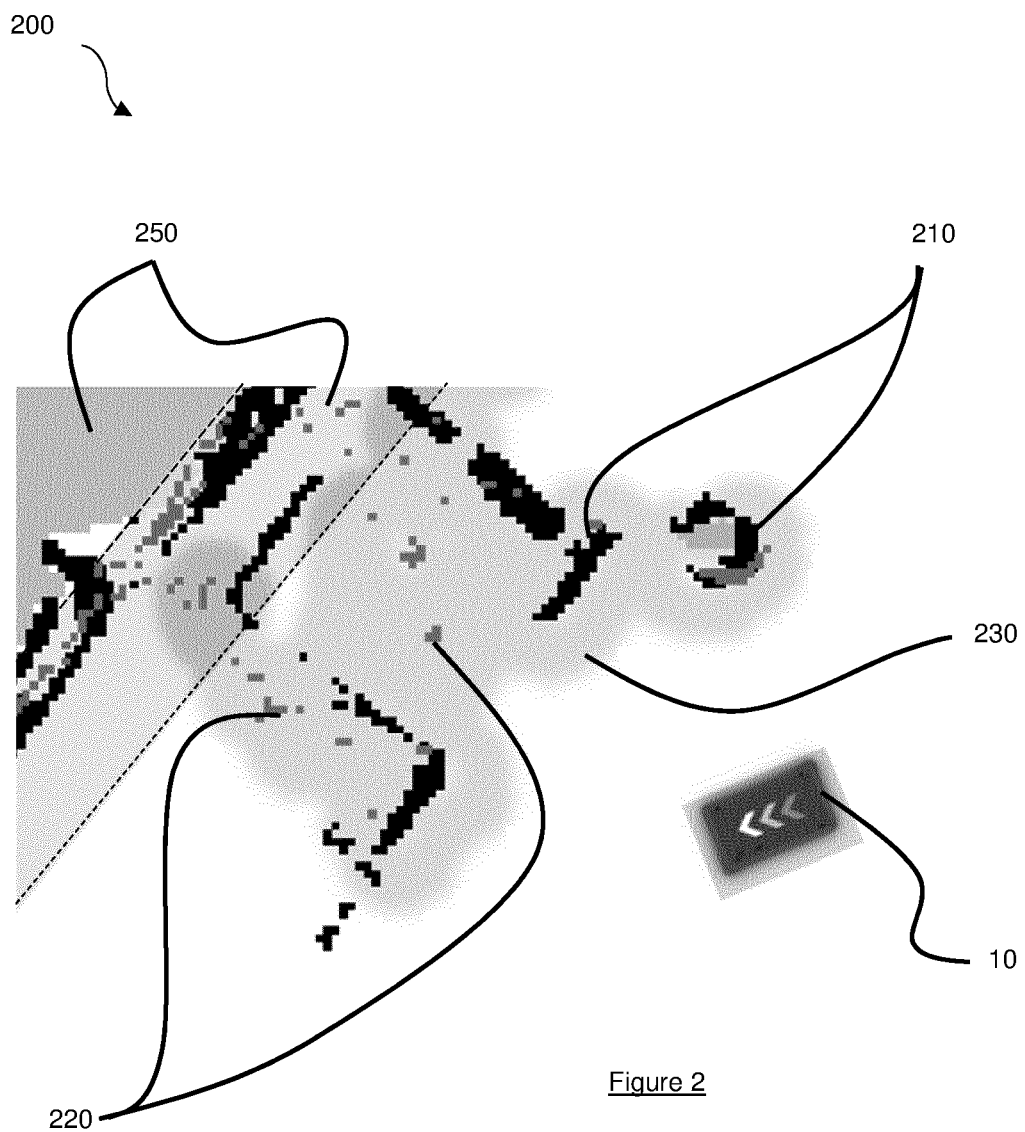
FIG. 2 shows a schematic view of an example navigation plot for the autonomous mobile robot of FIG. 1.

As shown in FIG. 2, embodiments of the invention may utilise the pair of horizontal scanners for localisation in a similar manner to existing systems and FIG. 2 shows a typical navigation plot in an x-y plane. A previously recorded map of the environment may be provided which includes previously observed items 210 as shown in black pixels in FIG. 2. The map may also define regions or boundaries 250 into which the robot 10 will not travel. The dark pixels 220 are indicative of obstacles identified by the horizontal LiDAR scanners which assists with navigation. In accordance with embodiments of the invention the robot also acquires addition information through the scan envelope with identified objects being shown in light grey shading 230 in FIG. 2.

In accordance with embodiments the point data from each scanner may be stitched together and, optionally, combined with the stored map data. This enables a detailed 3D plot of the environment to be accumulated in a rapid and accurate manner.

Figure 3A:
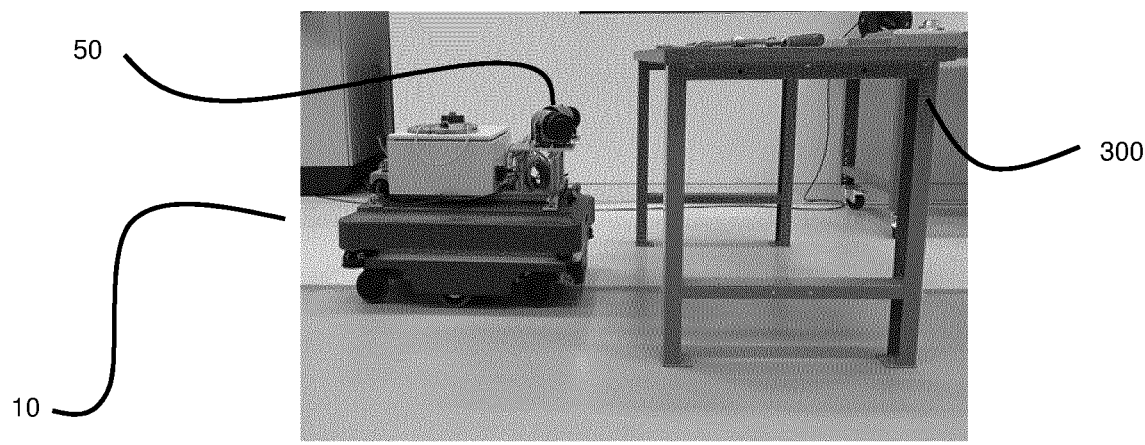
FIG. 3 shows an example of an autonomous mobile robot approaching an object and the corresponding scan data produced.
Figure 3B:
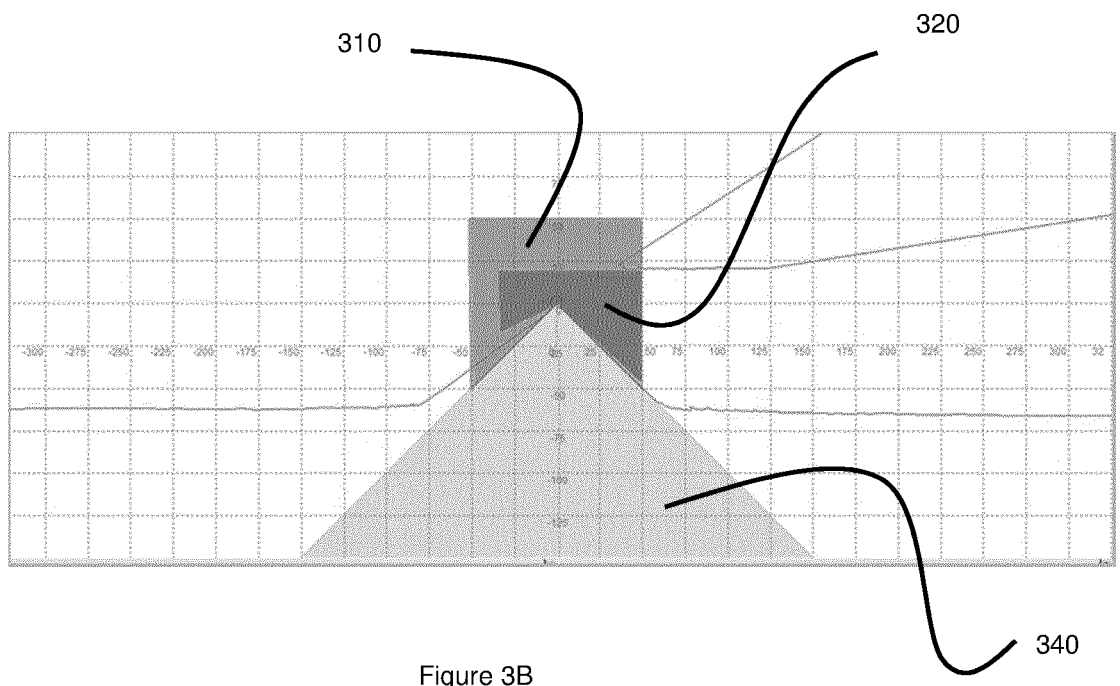
Figure 4:
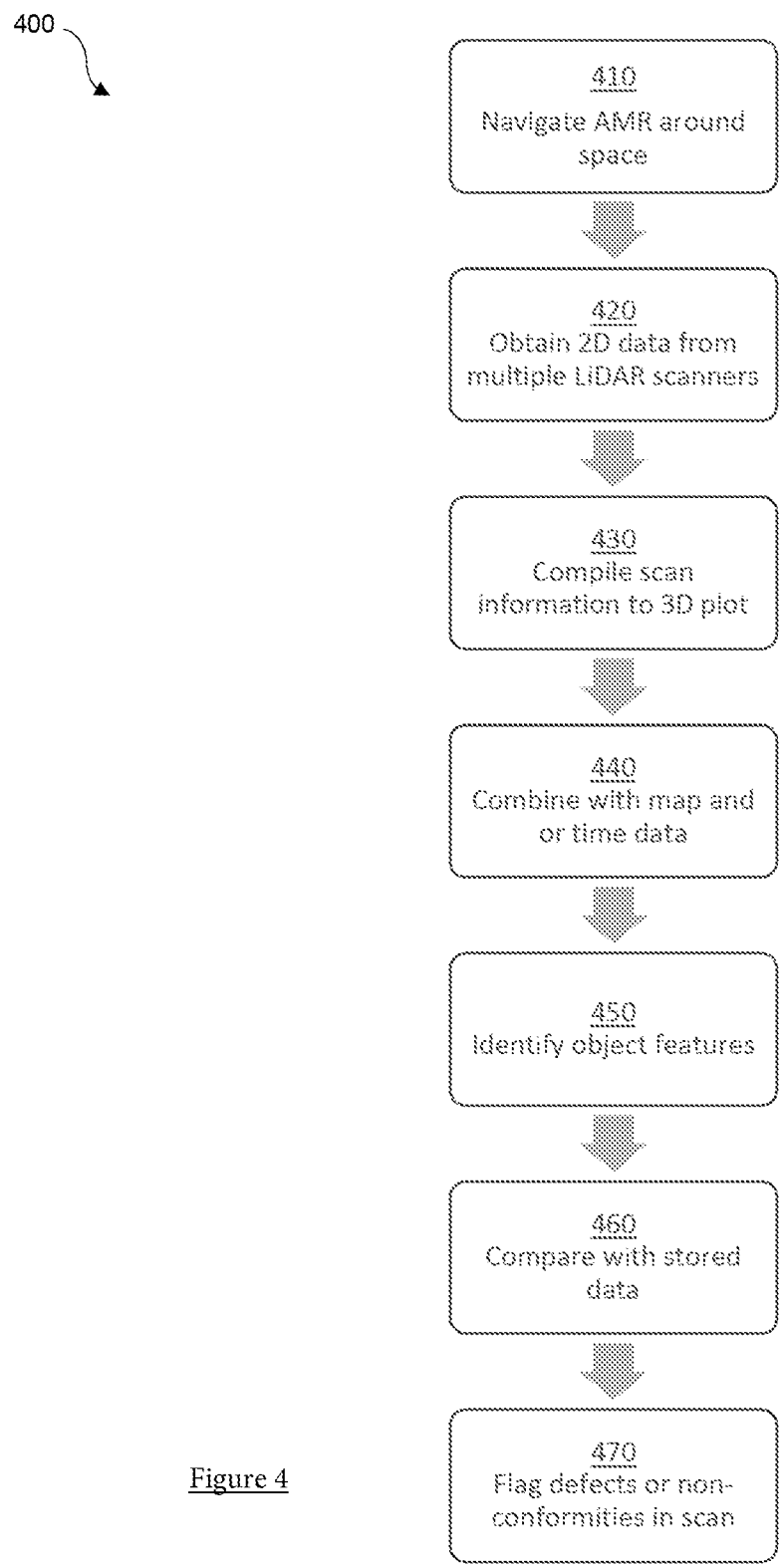
FIG. 4 shows a flow chart representing a method in accordance with an embodiment.

An example of the multi-scanner approach is illustrated in FIG. 3. This is illustrated in FIG. 3. In FIG. 3A a photograph shows an autonomous mobile robot 10 with an array of two-dimensional LiDAR scanners 50 in accordance with an embodiment of the invention position in front of an overhanging obstacle (in the form of a work bench). The two-dimensional LiDAR scanner can record a cross section of the table as shown in FIG. 3B which may for example represent a warning zone 310 and emergency stop zone 320 and a blind spot 340.

By stitching the cross sections from each scanning plane 22, 24, 32, 34 and using the known position of the autonomous mobile robot within the scanning space embodiments of the invention may form a three-dimensional point cloud of the environment. An existing two-dimensional map may be used in forming the composite plot. The resulting plot can be used for improved navigation, for example by enabling the automated mobile robot to avoid overhanging objects when planning a route. However, the applicants have also identified that the plot is sufficiently accurate to also be used for the measurement of objects within the scan area. Thus, the autonomous mobile robot of embodiments can navigate around an article of aerostructure and form a three-dimensional map to be used for measuring features of the structure or for inspection and identification of defects or shape non-conformity. The system may for example have a machine-readable storage system containing data on the aerostructures to be inspected. The three-dimensional plot may be compared to stored data for example to identity and classify objects and/or defects in an object and/or conformity of the dimensions and/or profile of objects relative to design specifications.

Embodiments of the invention may provide clear advantages in enabling larger parts such as aircraft components to be inspected with precision in a short amount of time and without additional labour costs. This may for example allow more frequent inspection that than is currently feasible. It may also be appreciated that because the system and methods of embodiment are able to track multiple points simultaneously tracking can be enabled to see real-time deformations or movements in the components during the assembly phase. Systems and methods of the invention may for example save up to 80% of time compared to conventional methods such as manual measurements or using a laser tracker or radar.

Embodiments of the invention may also comprise a machine-readable storage medium comprising instructions executable by a processor. Such instructions may be used to implement the methods of embodiments of the invention using a suitable autonomously moveable robot.

Although the invention has been described above with reference to a preferred embodiment it will be appreciated that various modifications may be made without departing from the scope of the invention as defined in the appended claims. For example, whilst the embodiment described relates to a single autonomously controlled robot it will be appreciated that a number of such robots could be used in a single system with a networked controlled being used to combine and map the captured data.

Whilst embodiments described herein use the term "autonomously mobile robot" it may be appreciated that this can include other forms of autonomously guided vehicle. For example, in some embodiments of the invention it may be possible to utilise a multi-purpose autonomous vehicle to perform scanning using an array of two-dimensional scanners whilst also navigating a facility for another purpose (for example to deliver or move parts or structures).

It is to be noted that the term "or" as used herein is to be interpreted to mean "and/or", unless expressly stated otherwise.

The invention claimed is:

1. An autonomous inspection system comprising:
an autonomous mobile robot,
the autonomous mobile robot having a plurality of two-dimensional LiDAR scanners, wherein each of the two dimensional LiDAR scanners has a two-dimensional scanning plane,
the plurality of scanners being mounted on the autonomous mobile robot with scanning plane orientations which are non-coplanar; and
a processor configured to:
navigate the autonomous mobile robot within surroundings of the autonomous mobile robot;
during the navigation cause the plurality of two-dimensional LiDAR scanners on the autonomous mobile robot to scan the surroundings in each of the two-dimensional scanning planes and from the scan generate point data of the surroundings of the autonomous mobile robot;
compile the point data from the plurality of LiDAR scanners into a three-dimensional plot of the surroundings of the autonomous mobile robot;
from the three-dimensional plot of the surroundings, identify dimensions and/or a profile of an aerostructure within the surroundings;
obtain information regarding a design specification of the aerostructure which comprises design dimensions and/or a design profile of the aerostructure;
compare the dimensions and/or the profile of the aerostructure identified within the three-dimensional plot to the design dimensions and/or the design profile of the aerostructure from the design specification;
identify defects and/or non-conformities on the aerostructure based on the comparison, and
generate and output inspection data containing information regarding the defects and/or non-conformities.

2. The autonomous inspection system of claim 1, wherein the point data is detected by each of the plurality of two-dimensional LiDAR scanners, and the point data detected by each of the plurality of two-dimensional LiDAR scanners represents a cross section of the respective two-dimensional scanning plane in which the scanner is aligned.

3. The autonomous inspection system of claim 1, wherein the each of the two-dimensional LiDAR scanners has a fixed orientation relative to the autonomous mobile robot.

4. The autonomous inspection device as claimed in claim 1, wherein at least one of the two-dimensional scanning planes extends vertically above the autonomous mobile robot.

5. The autonomous inspection system of claim 3, wherein the plurality of two-dimensional LiDAR scanners is arranged as a pair of the two-dimensional LiDAR scanners and each of the two-dimensional scanning planes of the pair of the two-dimensional LiDAR scanners extend vertically and is inclined on opposing sides of an axis perpendicular to a plane of the autonomous mobile robot.

6. The autonomous inspection system of claim 5, wherein each of the LiDAR scanners in the pair of two-dimensional LiDAR scanners is configured to rotate relative to a longitudinal axis of the autonomous mobile robot.

7. The autonomous inspection system of claim 1, wherein the plurality of two-dimensional LiDAR scanners comprises at least one two-dimensional LiDAR scanner arranged with a horizontal scan plane.

8. The autonomous inspection system of claim 7, wherein the plurality of the two-dimensional LiDAR scanners includes at least two of the two-dimensional LiDAR scanners each arranged with a horizontal scan plane and each having a scanning arc, wherein the scanning arcs are each arranged such that the horizontal scan planes for the at least two of the two-dimensional LiDAR scanners are aligned to provide 360-degree scan coverage around the autonomous mobile robot.

9. The autonomous inspection system of claim 1, wherein the processor is further configured to combine the point data with a map data stored in a memory accessible to the processor.

10. The autonomous inspection system of claim 1, wherein the processor is a processor of the autonomous mobile robot.

11. The autonomous inspection system of claim 1, wherein the autonomous mobile robot is one of a plurality of autonomous mobile robots each of which include two-dimensional LiDAR scanners and the processor is at least one processor, and the at least one processor is configured to:
navigate the plurality of autonomous mobile robots;
during the navigation, each of the plurality of autonomous mobile robots scan their respective surroundings in two-dimensional planes of their respective two-dimensional LiDAR scanners;
generate from the scans from the plurality of autonomous mobile robots point data of the surroundings of the plurality of the autonomous mobile robots; and
compile the point data into the three-dimensional plot of the surroundings of the plurality of autonomous mobile robots.

12. A method of scanning an airframe, the method comprising:
providing an autonomous mobile robot having a plurality of two-dimensional LiDAR scanners, the plurality of two-dimensional LiDAR scanners mounted on the autonomous mobile robots in non-coplanar scanning planes;
navigating the autonomous mobile robot around a space surrounding an aerostructure whilst scanning a space surrounding the autonomous mobile robot with the plurality of two-dimensional LiDAR scanners;
generating point data by the plurality of two-dimensional LiDAR scanners from the scanning of the space surrounding the autonomous mobile robot; compiling the point data generated by the plurality of two-dimensional LiDAR scanners into a three-dimensional plot of the space surrounding the aerostructure and/or of the aerostructure;
identifying dimensions and/or a profile of the aerostructure using the three-dimensional plot of the space surrounding the aerostructure;
obtaining information regarding a design specification of the aerostructure which includes design dimensions and/or a design profile of the aerostructure;
compare the dimensions and/or the profile of the aerostructure identified within the three-dimensional plot to the design dimensions and/or the design profile of the aerostructure;
identify defects and/or non-conformities on the aerostructure based on the comparison, and
generate inspection data containing information regarding the defects and/or non-conformities.

13. The method of scanning an airframe as claimed in claim 12, further comprising:
providing a map of the space surrounding the airframe in which the autonomous mobile robot is navigating; and
compiling an image of the aerostructure by combing the map with the point data.

14. The method of scanning an airframe as claimed in claim 12, further comprising:
identifying features within the image of the aerostructure and comparing dimensions and/or profile of the features with stored data to flag defects or non-conformities in the airframe.

15. The method of scanning an airframe of claim 12, wherein the autonomous mobile robot is one of a plurality of autonomous mobile robots each of which include two-dimensional LiDAR scanners,
the navigating the autonomous mobile robot includes navigating the plurality of autonomous mobile robots around the space surrounding an aerostructure whilst each of the plurality of autonomous mobile robots scans the space surrounding the respective autonomous mobile robot with the two-dimensional LiDAR scanners on the respective autonomous mobile robot;
the generating point data includes generating the point data generated by the two-dimensional LiDAR scanners on each of the plurality of the autonomous mobile robots; and
the compiling the point data into the three-dimensional plot includes compiling the point data generated by the two-dimensional LiDAR scanners on each of the plurality of autonomous mobile robots.

16. A machine-readable storage medium comprising instructions executable by a processor to:
receive two-dimensional point data of a scanned aerostructure from a plurality of LiDAR scans, stitch the two-dimensional point data to form a three-dimensional plot of the aerostructure;
combine the three-dimensional plot with stored mapping data; and
identify dimensions and/or a profile of the aerostructure within the three-dimensional plot and compare the dimensions and/or profile of the identified features with stored data to flag defects or non-conformities in the scanned object.

17. An autonomous mobile robot system comprising:
two-dimensional LiDAR scanners, each of the two-dimensional LiDAR scanners having a fixed two-dimensional scanning plane extending outwardly from at least one autonomous mobile robot, wherein the two dimensional LiDAR scanners are positioned such that a three dimensional scanning envelope is defined around the at least one autonomous mobile robot extending outwardly in both a horizontal direction and a vertical direction beyond a periphery of the at least one autonomous mobile robot; and
at least one processor configured to;
navigate the autonomous mobile robot around a space surrounding an aerostructure while scanning a space surrounding the at least one autonomous mobile robot with the two-dimensional LiDAR scanners;
receive two-dimensional point data from the LiDAR scanners during and/or after the navigation of the at least one autonomous mobile robot around the space;
stitch the two-dimensional point data to form a three-dimensional plot of the space surrounding the at least one autonomous mobile robot;
identify dimensions and/or a profile of the aerostructure using the three-dimensional plot;
obtain information regarding a design specification of the aerostructure which includes design dimensions and/or a design profile of the aerostructure;
compare the dimensions and/or the profile of the aerostructure identified using the three-dimensional plot to the design dimensions and/or the design profile of the aerostructure;
identify defects and/or non-conformities on the aerostructure based on the comparison, and
generate and output inspection data containing information regarding the defects and/or non-conformities.

* * * * *